UNITED STATES PATENT OFFICE.

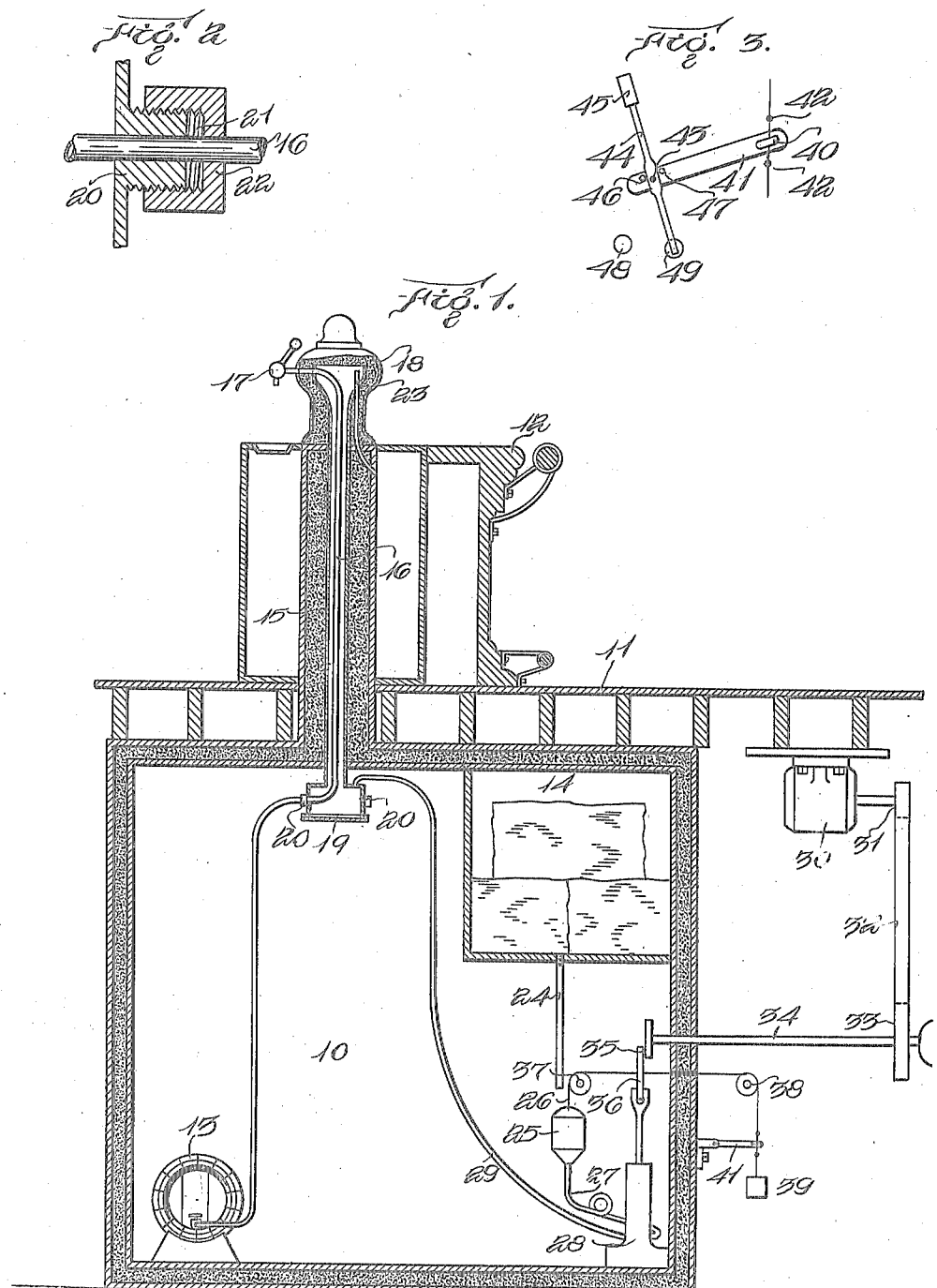

EDWARD R. BROWN, OF BOSTON, MASSACHUSETTS.

APPARATUS FOR COOLING AND DISPENSING BEVERAGES.

1,345,746.   Specification of Letters Patent.   Patented July 6, 1920.

Application filed March 20, 1915. Serial No. 15,826.

*To all whom it may concern:*

Be it known that I, EDWARD R. BROWN, a citizen of the United States, and resident of Boston, in the county of Suffolk and State of Massachusetts, have invented certain new and useful Improvements in Apparatus for Cooling and Dispensing Beverages, of which the following is a specification.

The present invention relates to an apparatus in which beverages, or other liquids to be cooled and delivered at a comparatively low temperature, may be contained and from which such liquids may be drawn and dispensed at need. The main object of the invention, briefly stated, is to maintain the temperature of the liquid in the package and up to the dispensing point at a substantially uniform temperature to avoid the ill effects which result from material changes of temperature and to avoid waste which often occurs as a result of the liquid having remained for a considerable time in a part of the apparatus which is not maintained at too low a temperature. A further object is to accomplish the results above indicated with an economical use of refrigerant.

For illustration, and because the embodiment of this invention shown in my drawings and particularly described in the following specification is especially designed for dispensing beer, but without thereby intending to limit the invention to any particular use, I will assume in the following description that the liquid which is cooled and dispensed in this apparatus is beer, and will briefly point out the considerations which cause the present invention to serve a useful purpose.

It has been established by experience that for the best satisfaction in regard to taste and other qualities of beer and other malt liquors and carbonated beverages that the temperature at which the beer, etc., is served should be between 41° and 45° Fahrenheit and that the beer should not have had its temperature greatly changed from within these limits between the time of brewing and the time of consumption. To attain this end it is necessary that the original package in which the beer is delivered to the retailer from the brewery should be kept at uniform temperature and not warmed above the temperature at which it is served, and further that there should be no opportunity for the beer in the pipes leading from the package to the dispensing point to become warm through standing in the pipe. I have devised an apparatus which secures these desired ends with the minimum expense, by means which I will now proceed to describe in connection with the accompanying drawings which form a part of this application.

Figure 1 is a sectional elevation, partly diagrammatic of an apparatus embodying the principles of my invention.

Fig. 2 is a sectional view of a detail of construction.

Fig. 3 is a detail elevation of a switch forming part of the apparatus.

The same reference characters indicate the same parts in all the figures.

Referring to the drawings 10 represents a refrigerator which is preferably located in the cellar, usually below the floor of the dispensing room. 11 represents the floor of the dispensing room and 12 represents the counter at which the beer is served. The refrigerator is a chamber sufficiently large to receive one or a number of packages of the beverages one of which is shown at 13 in the form of a beer cask. The refrigerator also has a compartment or receptacle 14 for refrigerant, such refrigerant being ordinarily ice. A conduit or standpipe 15 leads from a point within the refrigerator chamber upwardly to a point near the dispensing point, being concealed within the structure of the counter 12 and insulated against heat. The leading pipe 16 for the beer passes from the package 13 within the refrigerating chamber into the lower part of the conduit 15 through the side or bottom thereof, or otherwise, as most convenient, and extends through the conduit to a tap 17 below or above the counter, such tap being here shown as leading from an ornamental insulated case 18, which is mounted on top or under the counter and into which the conduit or standpipe extends.

The conduit or standpipe 15 here shown terminates in its lower end in an enlarged chamber 19 having a number of nipples 20 in its side walls through which the dispensing pipes 16 of a number of different packages may pass. The openings through which said pipes 16 pass are made liquid tight by means of packings 21 and glands 22, and the standpipe is otherwise tight at all points to prevent leakage and loss of the refrigerant contained therein. An overflow pipe 23 conducts the excess of the refrigerant which is supplied to the conduit away to the waste.

An important feature of this invention is that the water of liquefaction produced by the melting of ice in the ice box 14 is transferred to the standpipe 16, and I have provided an automatic means for causing a continual transferral of such water of liquefaction to the standpipe. A means which I have provided for the purpose consists of the following elements and mechanism. The waste outlet 24 from the ice box 14, through which the water of liquefaction escapes is directly over a receptacle 25, which is suspended by a cord or the like 26. A flexible pipe 27 leads from the bottom of the receptacle 25 to the intake of a pump 28, and another pipe 29 leads from the outlet of the pump to the chamber 19 at the bottom of the standpipe. The pipes 27 and 29 thus constitute a conduit or conducting means, in which the pump is interposed and of which the pump chamber forms a part, for transferring or conveying the accumulated water of liquefaction from the ice box to the standpipe.

The pump is operated automatically, and may be thus operated continuously or intermittently according to whether or not the melting ice supplies enough water to keep the pump in constant operation. Ordinarily the supply of water so furnished is less than the capacity of the pump, whence it becomes necessary that the pump shall operate only intermittently, and I have accordingly provided an automatic means for starting the pump from time to time when enough water of liquefaction has collected, and for stopping the pump when such accumulation of water has been transferred to the standpipe.

In Fig. 1 I have illustrated diagrammatically an electric motor 30 as the prime mover for actuating the pump, such motor being outside of the refrigerator and being organized to drive the pump through a pulley 31 on its armature shaft or geared thereto, a belt 32 and a pulley 33 on a counter shaft 34 which passes through a wall of the refrigerator above the pump and is provided with a crank pin 35 acting through a connecting rod 36 on the pump plunger. The pump, by the way, is preferably located in the refrigerator in order that the liquid therein may be kept at a low temperature and insulated from higher temperatures outside of the refrigerator. The receptacle 25 is caused to start and stop the pump by actuating a switch in the electric circuit of the motor through descent of the receptacle as it becomes filled and rise of the receptacle as the accumulation of water therein is pumped out.

Such control of the pump is effected as follows: The suspension cord or wire from which the receptacle is hung passes over a pulley 37 in the refrigerator and thence through the wall of the refrigerator over a guide pulley 38 on the outside, and to its end is attached a weight 39. That portion of the cord which passes from the pulley 38 to the weight passes through a lug 40 (see Fig. 3) on a switch operating lever 41, and is provided with stops 42 above and below said lug. The operating lever 41 is mounted on a pivot 43 to which is also pivoted a switch 44 having a weighted arm 45 above the pivot. Pins or other projections 46, 47 are carried by the lever 41 on opposite sides of the weighted arm of said switch, and the switch is arranged to engage either one of two contacts 48 and 49, being so connected electrically, in any known or desired manner that when in contact with the contact member 49 it completes the circuit of the motor, and when in any other position it breaks such circuit.

Weight 39 is heavy enough to overbalance the empty receptacle 25, but less heavy than such receptacle and its content of water. I prefer so to design the weight that it will overbalance the receptacle while the latter retains a certain small quantity of water.

It will now be understood that when enough water of liquefaction from the outlet of the ice box has collected in the receptacle to overbalance weight 39, the receptacle descends, the weight is raised, and the switch operating lever 41 is so moved as to put the switch 44 in circuit closing position. Then the pump is started and the accumulated water in the receptacle is transferred toward the standpipe until enough has been withdrawn from the receptacle to make the latter lighter than the weight, whereupon the weight descends and the switch is thrown into open position, stopping the motor and pump. In this way the pump is constantly periodically to transfer accumulations of the water produced by melting of the ice in the ice compartment to the standpipe 15.

The water so transferred is cold, being at or slightly above the temperature of melting ice, and is delivered to the bottom of the standpipe. As successive quantities of water are thus transferred, the water previously delivered to the standpipe is raised therein until the standpipe is full, when the water at the top is caused to pass out through the overflow when the column is raised by fresh accretion at the bottom. As the cold water, which is denser and heavier than that which may have become warmed by standing in the standpipe, is supplied at the bottom, there is no mixing of cold with warmer water, and hence no opportunity for a portion of the water to remain in the standpipe long enough to become raised in temperature very materially, so that such water is maintained at nearly constant temperature.

It will thus be seen that I have provided a means by which not only is the package or cask containing the beer subjected to a low temperature in the refrigerator, but also that the pipe through which the beer is conducted to the tap is also maintained at low temperature by thermal contact with the cold water in the standpipe. There is thus no opportunity for the beer to become appreciably warmed after it leaves the refrigerator and before being delivered, and particularly is there no opportunity for the beer to become warm by standing over night in the pipes, or at other times when there is little or no demand, because no matter how long the beer may stand in the pipe the surrounding water in the standpipe or conduit 15 is kept at low temperature by the constant additions of the quantities of cold water furnished by the ice melting in the refrigerator. Accordingly as long as the refrigerator is supplied with ice the conduit is supplied with cold water. A serious item of waste with some forms of dispensing and cooling apparatus on the market has been that due to waste of the beer which has become warmed through standing in the pipes over night and which has to be drawn off before cold beer from the cask in the refrigerator is delivered at the tap. Another important feature of my invention is that the beer in the pipes is kept cool without additional expense for refrigerant. I am aware that apparatus have already been made having provision for icing the pipes between the refrigerator and the tap, but such apparatus entail additional expense for the ice required for this purpose. My invention eliminates this expense by utilizing the low temperature of water which is inevitably produced in all refrigerators and which is ordinarily wasted. It also prevents undesirable chilling of the liquor when standing for some time in the pipes.

Various modifications and reorganizations of the apparatus from the specific embodiment shown in the drawings and hereinbefore described may be made without departing from the spirit of the invention or from the scope of the appended claims. For instance, in certain aspects of the invention it is not essential that the pipe leading to the delivery point from the upper limit of the refrigerator be contained within an outer pipe or conduit in which the cold water is contained, since the essential conditions are fulfilled by any apparatus in which the cold water is led in thermal contact with the pipe conducting the beer. In another aspect of the invention, in so far as concerns maintaining the beer at a low temperature in its passage from the refrigerator to the delivery tap, it is not essential that the refrigerant be ice or the substance in thermal contact with the beer pipe between the refrigerator and the tap, be the water produced by melting ice. The essentials of this feature of the invention involve any refrigerant, whatever the same may be, and any cold liquid which is brought into thermal contact with the beer pipe between the refrigerator and the tap.

Of course the invention is adapted to be used for dispensing any sort of beverage, or in fact for cooling any liquid which is delivered from time to time in small quantities from a container, and I therefore do not intend the descriptive terms and names heretofore used to be understood with any limiting significance.

What I claim and desire to secure by Letters Patent is:

1. An apparatus of the character described comprising a chamber having an ice compartment and adapted to contain a beverage package, a conduit rising from said chamber, a pipe leading from said package in heat transferring proximity with the contents of said conduit to an outlet, a receptacle arranged to catch the water of melted ice draining from said receptacle, and means for periodically transferring water from said receptacle to said conduit.

2. A means for dispensing and maintaining the temperature of brewed beverages comprising the combination of a refrigerating chamber, a beverage package in said chamber, a dispensing pipe leading from said package to a point outside of said chamber, an ice holder in the chamber, a receptacle located to collect the water resulting from melting of ice held by said holder, a conduit arranged to conduct such water from said receptacle in heat-transferring proximity to the dispensing pipe outside of said chamber, and means for propelling such water through said conduit, the water having approximately the room temperature of said chamber and maintaining the beverage in said dispensing pipe substantially at that temperature up to a point near the point of delivery.

3. The combination of a refrigerator, a standpipe having a closed bottom leading from said refrigerator, a dispensing pipe leading from the interior of said refrigerator into and through said standpipe, an ice box in said refrigerator, a pump, and automatic means for causing said pump from time to time to transfer the accumulated water of liquefaction from said ice box to said standpipe.

4. A liquid cooling and dispensing apparatus comprising a refrigerator having a compartment adapted to contain refrigerant, a conduit leading upwardly from said refrigerator, a dispensing pipe passing from said refrigerator into said conduit and thence to the delivery point, a receptacle arranged to catch the drip from said compartment, conducting means leading from said receptacle to said conduit, a pump arranged in said conducting means for propelling liquid from the receptacle to the conduit and automatic means for setting said pump into operation when the liquid in the receptacle has accumulated to a certain amount, and for stopping the pump when such accumulation has been transferred to the conduit.

5. A liquid cooling and dispensing apparatus comprisng a compartment adapted to contain ice, a receptacle arranged to catch the water of liquefaction escaping from said ice compartment, conducting means leading from said receptacle out of the refrigerator to a relatively remote point, a pump interposed in said conducting means, the receptacle being mounted with capacity for moving up and down, a counterbalance weight opposing downward movement of said receptacle and adapted to be overbalanced when said receptacle is full of water, a motor controller operable by movements of said receptacle and weight for putting the pump into and out of action, and a dispensing pipe leading from said refrigerator to a delivery point, and being in thermal contact with the water in said conducting means outside of the refrigerator.

6. The combination with a refrigerator having an ice compartment, of a beverage package within said refrgerator, a dispensing pipe leading from said package out of the refrigerator to an elevated discharge point, a receptacle in the refrigerator arranged to receive the water of melted ice from said ice compartment, a conduit leading from said receptacle out of the refrigerator and arranged to bring its contents in thermal contact with said dispensing pipe, and automatic means for periodically withdrawing the contents of said receptacle and propelling the same through said conduit.

In testimony whereof I have affixed my signature in presence of two witnesses.

EDWARD R. BROWN.

Witnesses:
  E. P. BRANNEN,
  P. W. PEZZETTI.